United States Patent
Fox et al.

(10) Patent No.: US 10,891,336 B2
(45) Date of Patent: Jan. 12, 2021

(54) COLLABORATIVE LEARNED SCOPING TO EXTEND DATA REACH FOR A SEARCH REQUEST

(71) Applicant: International Business Machines Corporation, Armonk, NY (US)

(72) Inventors: Jeremy R. Fox, Georgetown, TX (US); Kelley Anders, East New Market, MD (US); Liam S. Harpur, Dublin (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 16/218,942

(22) Filed: Dec. 13, 2018

(65) Prior Publication Data

US 2020/0192943 A1 Jun. 18, 2020

(51) Int. Cl.

| G06F 7/02 | (2006.01) |
|---|---|
| G06F 16/00 | (2019.01) |
| G06F 16/903 | (2019.01) |
| G06F 16/9038 | (2019.01) |
| G06N 3/04 | (2006.01) |

(Continued)

(52) U.S. Cl.
CPC .... *G06F 16/90335* (2019.01); *G06F 16/3334* (2019.01); *G06F 16/9038* (2019.01); *G06N 3/04* (2013.01); *G06F 16/906* (2019.01)

(58) Field of Classification Search
CPC ........... G06F 16/90335; G06F 16/9038; G06F 16/3334; G06F 16/906; G06F 16/90; G06N 3/04; H04L 51/16; H04L 51/04; H04L 51/02; H04L 51/32

See application file for complete search history.

(56) References Cited

U.S. PATENT DOCUMENTS

| 6,006,213 A | 12/1999 | Yoshida |
|---|---|---|
| 10,038,756 B2 | 7/2018 | Ramer et al. |

(Continued)

OTHER PUBLICATIONS

Carter, J., "Why Contextual Awareness is about to Change the Way you Use Tech", Jul. 12, 2014, [Retrieved on Nov. 18, 2018]. Retrieved from the Internet at <URL: https://www.techradar.com/news/software/applications/why-contextual-awareness-is-about-to-change-the-way-you-use-tech-1256939/2>, Total 16 pp.

(Continued)

*Primary Examiner* — Bruce M Moser
(74) *Attorney, Agent, or Firm* — Konrad Raynes Davda & Victor LLP; Janaki K. Davda

(57) ABSTRACT

Provided are techniques for collaborative learned scoping to extend data reach for a search request. From monitoring prior collaboration data of entities discussing topics, the topics, access response times to data sources with content objects for the topics, and topic response content of the content objects are derived. A data reach model is built using the topics, the access response times, the topic response content, and data sources of the topics. For a topic of the topics, the data reach model is used to determine a new data source to be added and a duration of adding the new data source based on real time entity activity. The new data source is added to a data reach of the current group of entities. In response to receiving a search request, the search request is issued against the data sources and the new data source, and results are returned.

18 Claims, 19 Drawing Sheets

(51) Int. Cl.
*G06F 16/33* (2019.01)
*G06F 16/906* (2019.01)

(56) References Cited

U.S. PATENT DOCUMENTS

| | | | |
|---|---|---|---|
| 2006/0041531 | A1 | 2/2006 | Provoost |
| 2015/0078247 | A1 | 3/2015 | Maharajh et al. |
| 2018/0025010 | A1 | 1/2018 | Ramer et al. |
| 2018/0233132 | A1* | 8/2018 | Herold .................. G06F 3/017 |
| 2018/0349500 | A1* | 12/2018 | Tremblay ............ G06F 16/9535 |
| 2020/0120170 | A1* | 4/2020 | Amitay ................ H04W 4/021 |

OTHER PUBLICATIONS

"Cisco Global Cloud Index: Forecast and Methodology, 2016-2021 White Paper", Feb. 1, 2018, [online], [Retrieved on Nov. 18, 2018]. Retrieved from the Internet at <URL: https://www.cisco.com/c/en/us/solutions/collateral/service-provider/global-cloud-index-gci/white-paper-c11-738085.html>, Document ID:1513879861264127, Total 45 pp.

Investopedia, "Deep Learning", [online], [Retrieved on Nov. 21, 2018]. Retrieved from the Internet at <URL: https://www.investopedia.com/terms/d/deep-learning.asp>, 2018 Investopedia, LLC., Total 3 pp.

McEvoy, M., "7 Reasons Google Search Results Vary Dramatically", Sep. 29, 2015, [online], [Retrieved on Nov. 18, 2018]. Retrieved from the Internet at <URL: https://www.webpresencesolutions.net/7-reasons-google-search-results-vary-dramatically/>, Total 9 pp.

Mell, P. and T. Grance, "Effectively and Securely Using the Cloud Computing Paradigm", [online], Oct. 7, 2009 retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

"21 Big Data Statistics & Predictions on the Future of Big Data", [online], [Retrieved on Nov. 18, 2018]. Retrieved from the Internet at <URL: https://www.newgenapps.com/blog/big-data-statistics-predictions-on-the-future-of-big-data>, Total 13 pp.

\* cited by examiner

```
def model(data, X_train, Y_train, X_test, Y_test, num_iterations = 2000, learning_rate = 0.5, print_cost = False):
    """
    Builds the logistic regression model Arguments:
        data -- text corpus
        X_train -- training set represented by a numpy array of topic
        Y_train -- training labels represented by a numpy array (vector) of topic
        X_test -- test set represented by a numpy array of topic
        Y_test -- test labels represented by a numpy array (vector) of topic
        num_iterations -- hyperparameter representing the number of iterations to optimize the parameters
        learning_rate -- hyperparameter representing the learning rate used in the update rule of optimize()
        print_cost -- Set to true to print the cost every 100 iterations Returns:
        d -- dictionary containing information about the logistic regression model.
    """
```

```
W, b = initialize_with_zeros

Parameters, grads, costs = optimize_for_graident_descent

W = parameter_retrived
B = parameter_retrived

Y_prediction_test = prediction(w, b, test_data)
Y_prediction_train = prediction(w, b, training_data)

Print "Train accuracy"
Print "Test accuracy"
```

```
def predict(w, b, X):

m = topic_array
    Y_prediction = topic_array_value
    w = w.ratetopic(topic_array_value)

A = sigmoid(topic_array_value(prediction_parameters))

for i in range(topic_array)

if value <= 0.5:
            Y_prediction[0,i]=0
        else:
            Y_prediction[0,i]=1 assert(Y_prediction.topic == (topic_array))

return Y_prediction
```

FIG. 9A

```
In []:
    currentDRLevel = lookupDRLevel(productName);
    optimumDRLevel = DREvent.getDRLevel();

if currentDRLevel < optimumDRLevel :
        deamon.changeDRLevel(productName, DREvent.getDRLevel());
    else :
        #Determine if a given duration is passed
        if deamon.durationPassed(productName, DREvent.getDuration()):
            deamon.restoreDRLevel(productName)
```

FIG. 9B

```
In []:
    if matchesChangeDRKeyword(message_space) :

#Look up product Name from a given message
    productName = lookupProductFromMessage(message_space)

#Construct data input for model
    X = constructModel(message_space, productName);
    #Predict optimum log level and durations
    DREvent = model.predict(w, b, X)

return logEvent;
```

COLLABORATIVE LEARNED SCOPING TO EXTEND DATA REACH FOR A SEARCH REQUEST

BACKGROUND

1. Field of the Invention

Embodiments of the invention relate to collaborative learned scoping to extend data reach for a search request.

2. Description of the Related Art

A search engine receives a search request from a user and executes the search request to obtain results. There are many different elements that determine the results (e.g., the type of device used for the search, the user's personal search history, etc.). Users, devices, bots and other entities may have dynamic constraints on what data sources those entities may access. For example, user3 or bot 4 may be able to access 342 databases/repositories on average at 3 pm, but at 5 pm, user3 or bot 4 may be able to access 7329 databases/repositories because of some explicit constraint or other constraint that the entity is not aware of.

SUMMARY

In accordance with embodiments, a computer-implemented method is provided for collaborative learned scoping to extend data reach for a search request. The computer-implemented method comprises operations. From monitoring prior collaboration data of entities discussing topics, the topics, access response times to data sources with content objects for the topics, and topic response content of the content objects are derived. A data reach model is built using the topics, the access response times, the topic response content, and data sources of the topics. It is determined that a topic of the topics is currently being discussed by a current group of entities. The data reach model is used to determine a new data source to be added and a duration of adding the new data source based on real time entity activity. The new data source is added to a data reach of the current group of entities. In response to receiving a search request, the search request is issued against the data sources and the new data source, and results are returned in response to the search request.

In accordance with other embodiments, a computer program product is provided for collaborative learned scoping to extend data reach for a search request. The computer program product comprising a computer readable storage medium having program code embodied therewith, the program code executable by at least one processor to perform operations. From monitoring prior collaboration data of entities discussing topics, the topics, access response times to data sources with content objects for the topics, and topic response content of the content objects are derived. A data reach model is built using the topics, the access response times, the topic response content, and data sources of the topics. It is determined that a topic of the topics is currently being discussed by a current group of entities. The data reach model is used to determine a new data source to be added and a duration of adding the new data source based on real time entity activity. The new data source is added to a data reach of the current group of entities. In response to receiving a search request, the search request is issued against the data sources and the new data source, and results are returned in response to the search request.

In yet other embodiments, a computer system is provided for collaborative learned scoping to extend data reach for a search request. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operation. From monitoring prior collaboration data of entities discussing topics, the topics, access response times to data sources with content objects for the topics, and topic response content of the content objects are derived. A data reach model is built using the topics, the access response times, the topic response content, and data sources of the topics. It is determined that a topic of the topics is currently being discussed by a current group of entities. The data reach model is used to determine a new data source to be added and a duration of adding the new data source based on real time entity activity. The new data source is added to a data reach of the current group of entities. In response to receiving a search request, the search request is issued against the data sources and the new data source, and results are returned in response to the search request.

BRIEF DESCRIPTION OF THE SEVERAL VIEWS OF THE DRAWINGS

Referring now to the drawings in which like reference numbers represent corresponding parts throughout:

FIGS. 6A and 6B illustrate example pseudocode for generating a data reach model in accordance with certain embodiments.

FIGS. 9A and 9B illustrate example pseudocode for adding a data source in accordance with certain embodiments.

FIG. 11 illustrates example pseudocode for embedding the data reach model in a collaboration platform in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

There exists a collaboration mis-match in terms of what entities may collaborate on and what those entities are aware of in terms of their Data Reach (DR) and their collaboration team's data reach. An entity may be a user, device, bot, etc. Data reach may be described as the data sources (e.g., databases or data repositories) that the entity has access to for executing a search. Embodiments advantageously solve this by using topic awareness of digital interactions (e.g., collaborations via chats, electronic mails ("e-mails"), social media, social networking sites, blogs, conferencing applications, etc.) to infer the likelihood of whether a collaboration interaction has access to the data sources that are most relevant to a topic being discussed, and, if not, extend the data reach for the digital interactions. Embodiments may also notify the entities of the sub-optimal topic awareness (e.g., for this particular time, device, context, etc.). Sub-optimal topic awareness may be described as the data reach of the group not including the data sources that are most relevant to the topic.

Figure 1:
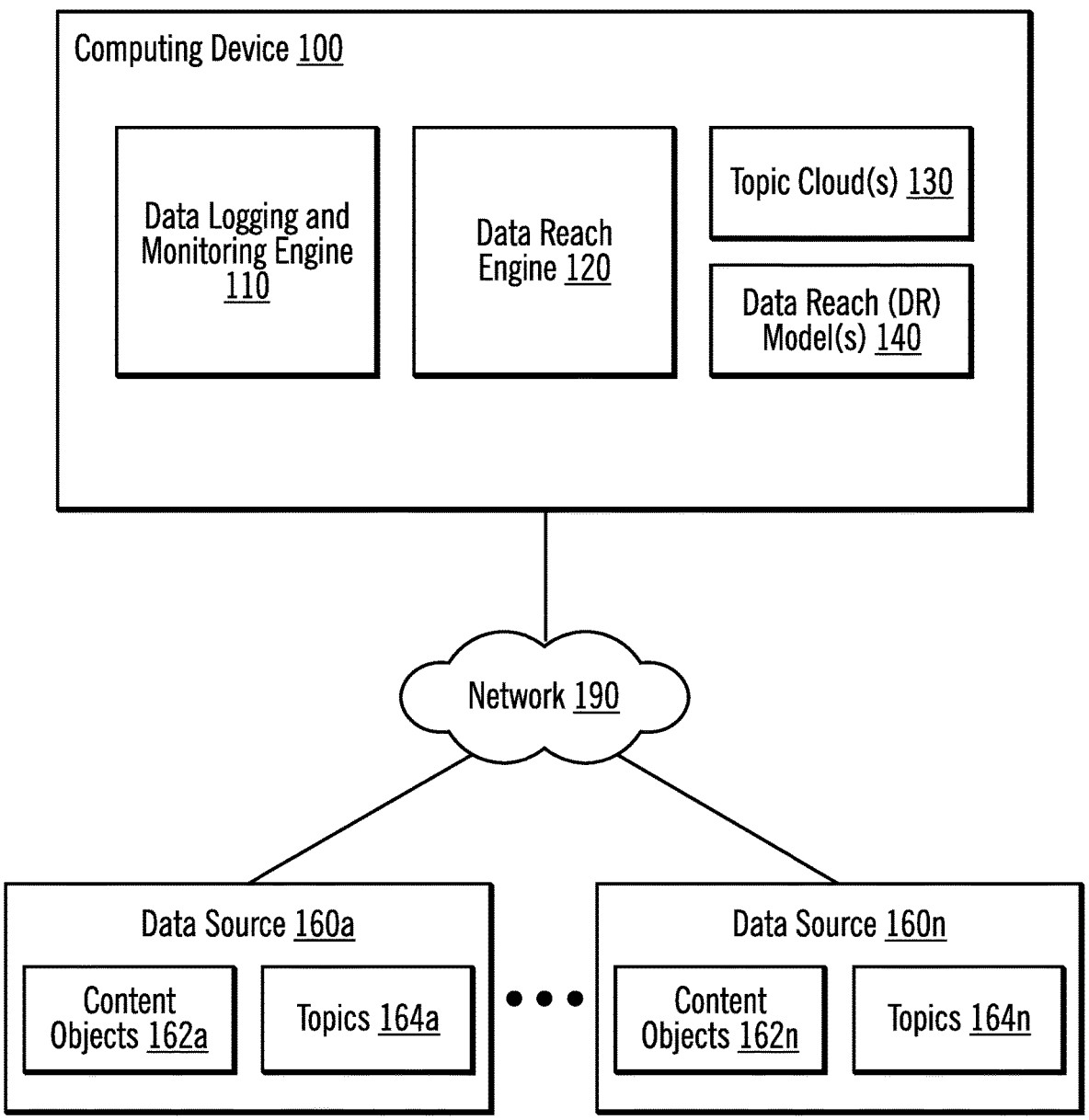
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes a data monitoring and logging engine 110 and a data reach engine 120. The data monitoring and logging engine 110 monitors collaboration platforms (e.g., chats, electronic mails ("e-mails"), social media, social networking sites, blogs, conferencing applications, etc.) to generate topic clouds 130. In certain embodiments, the topic clouds 130 represent topics being discussed on the collaboration platforms. The collaboration platforms may also be described as space/channel applications. The data reach engine 120 generates Data Reach (DR) models 140. In certain embodiments, for each topic cloud 130, the data reach engine 120 generates a data reach model 140. The computing device 100 is coupled, via a network 190, to data sources 160a . . . 160n.

Each of the data sources 160a . . . 160n may include content objects (e.g., documents, images, blogs, web pages, etc.) and topics of those content objects. For example, data source 160a includes content objects 162a and topics 164a, and data source 160n includes content objects 162n and topics 164n. Although the topics are shown in the data sources 160a . . . 160n, the data reach engine 120 may also store a list of data sources and topics of content objects at those data sources. In certain embodiments, the data reach engine 120 may also store a score to indicate how many content objects for a particular topic are stored in a particular data store. This may later be used to identify data sources 160a . . . 160n that are most relevant for a topic being discussed on the collaboration platforms (e.g., the more content objects that the data store has for the topic, the higher the score and the more likely that the data source is selected for extending data reach).

As more users communicate via the collaboration platforms, it is possible that some of those users have a data reach problem. A data reach problem may be described as access to a pre-determined, limited or constrained number of data sources. The data reach engine 120 provides a pre-emptive solution to enable those users to access more data sources for executing searches. The data reach engine 120 uses prior collaboration data for topic modelling and measures the resultant data reach. Then, the data reach engine 120 derives a data reach model (using a pre-defined branching process). The data reach engine 120 uses the data reach model to determine whether a particular collaboration of entities is likely suffering from sub-optimal data reach (e.g., less data reach than other collaborators had for that topic). The data reach engine 120 tags collaborations and holds these in a collaboration queue, where remedial action is applied to extend data reach to one or more additional data sources. The data reach models may be generalized and deployed as an inter-collaboration solution.

Embodiments provide proactive and predictive membership expansion based on data reach for a group of entities. In certain embodiments, when a group of entities (e.g., users) are utilizing the data reach model, the data reach engine 120 proactively expands the data reach of the group. The data reach engine 120, through evaluation of a collaborator profile of entities within the group, expands that data reach through targeted addition of one or more new entities to the group, based on the known or implied further data reach of the one or more new entities. Thus, the data reach engine 120 allows for the group's data reach to be expanded within an area of subject matter expertise, one or more known data points, or other quantifiable projection of expertise of the one or more new entities to potentially be added to the group. With such embodiments, the data reach engine 120 forecasts and predicts where to expand the membership of the group, based on an area of known lacking data reach. Through utilizing known members existing social connections and contacts, the data reach engine 120 may target data reach for growth within certain areas. Further, understanding the baseline of the data reach is useful, as is, knowing where to grow the data reach. In certain embodiments, the data reach engine 120 may have a goal for data reach growth that is static or dynamic based on machine learning as the subject matter evolves over time.

In certain embodiments, the data reach engine 120 is applied to determining the statistical significance of the search results based on the population for which an entity (user, bot, account, etc.) has data reach. If the data reach engine 120 determines that the results are not sufficiently statistically significant, the data reach engine 120 may apply a remedial action to continue iterating on adding one or more entities to the group to get to the tipping point of providing sufficiently statistically significant data reach.

In certain embodiments, the data reach engine 120 refines a branching model using a stochastic state model to determine the reward after an initial state scoping. Branching, in software development or search, refers to taking a tangential course off the main. Stochastic modeling estimates probability distributions of potential outcomes by allowing for random variation in one or more inputs over time. The random variation is usually based on fluctuations observed in historical data for a selected period using standard time-series techniques. In the case of search, the data reach engine takes the main search scope, then creates an initial branching or tangential pathways. The data search engine 120 then uses a stochastic model to further refine that initial branching to estimate the probability distributions of the different scoping results.

The data reach engine 120 provides entities with a technique to infer whether an entity has adequate data reach. In certain embodiments, to determine whether there is adequate data reach, the data search engine 120 identifies a topic being discussed and data sources for which the group of collaborators has access, and compares these data sources with data sources used for the topic in prior collaborations, discussing the same topic. In certain embodiments, if there is a difference in the data sources, the data reach engine 120 extends the data reach of the group of collaborators to include the additional data sources used by the prior collaborations discussing that same topic or builds based on the newly ascertained data sources defined.

Unlike conventional systems, the data reach engine 120 extends data-reach using the data reach model that provides a data reach assessment of data reach likelihood and provides additional remedial action.

Initially, analysis is performed on log data and user activity within a collaboration platform to infer trigger topics. Then, the data reach engine 120 uses this analysis, and, in particular, the topics, to derive the data reach model. The data reach engine 120 uses the data reach model to determine an optimal data reach level and duration of the level adjustment based on real time user activity in the space application (based on topic). An optimal data reach may be described as extending the number of data sources to provide additional data sources on the topic.

In certain embodiments, the data reach model may be embodied through the architecture of space/channel applications that monitor current collaboration levels and real-time chat discourse to infer the required data reach levels to optimally handle temporal topics.

In certain embodiments, the data reach model may be combined with deep learning systems to provide a predictive system of pre-emptive data reach adjustments.

Figure 2:
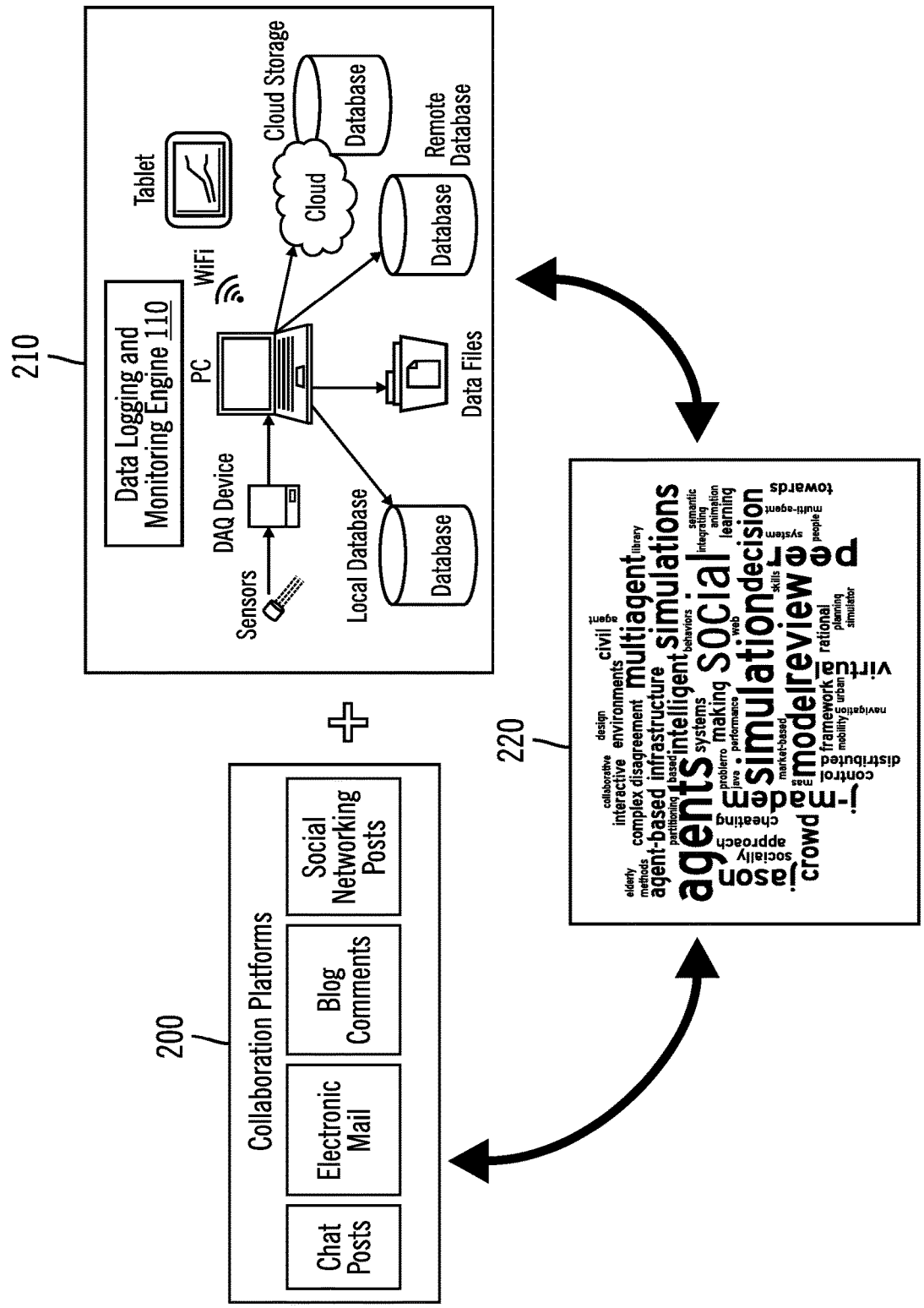
FIG. 2 illustrates generation of a topic cloud in accordance with certain embodiments.

FIG. 2 illustrates generation of a topic cloud in accordance with certain embodiments. In FIG. 2, there are collaboration platforms 200, which include chat posts, electronic mail, blog comments, and social networking posts. The data logging and monitoring 210 includes the data logging and monitoring engine 110 accessing various data sources and monitoring the collaboration platforms 200. The data logging and monitoring engine 110 generates the topic cloud 220. Thus, prior collaboration data of entities (e.g., of users, devices, bots, accounts, etc.) is topic modelled, and the access response time and topic response content is measured. The access response time may be described as an amount of time to access and retrieve content objects from a data source. The topic response content may be described as content of the content objects for that topic. The collected data is structured and analyzed to pay particular attention to topics of interest and remove the information that is not useful (e.g., is not related to the topics of interest). The topics of interest may be pre-determined or created using a derived topic cloud.

Once the topics of the topic cloud 220 are ascertained, the data reach engine 120 determines the data reach of each entity (e.g., of users, devices, bots, accounts, etc.). This may be achieved using client-side or server-side monitoring. That monitoring collects the topic and the probable data sources of the content objects for that topic.

Figure 3:
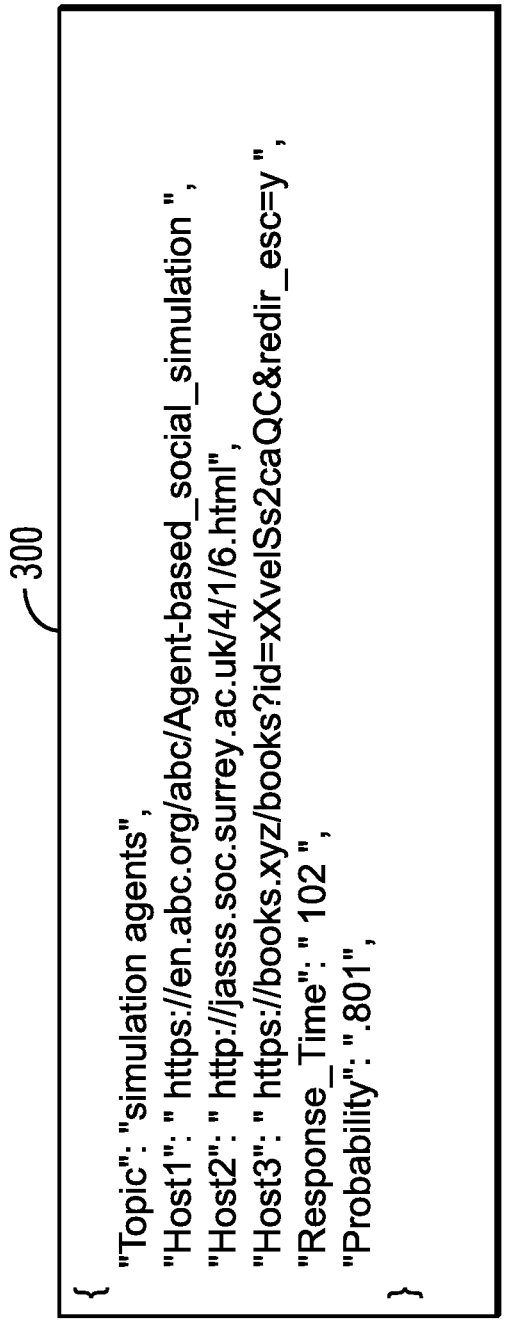
FIG. 3 illustrates an example data reach for a topic in accordance with certain embodiments.

FIG. 3 illustrates an example data reach list 300 for a topic in accordance with certain embodiments. In FIG. 3, the topic is "simulation agents", and the data reach is to "Host1", "Host2", and "Host3". The response time is "102" nanoseconds (this depends on the computing time of the devices in question), and the probability is "0.801" (which is derived from the data collected and the history, such as the topic cloud).

Figure 4:
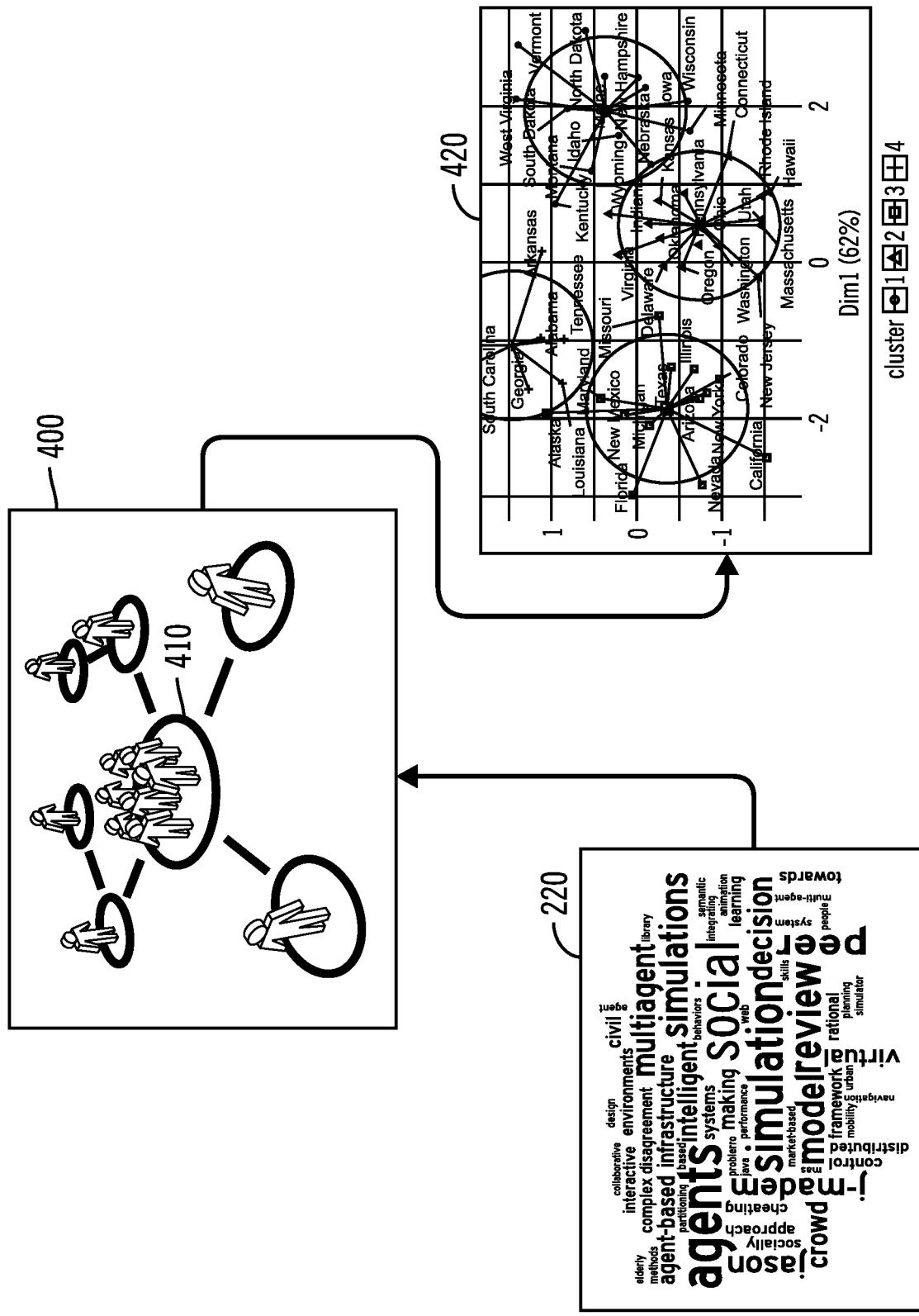
FIG. 4 illustrates visualizations in accordance with certain embodiments.

FIG. 4 illustrates visualizations in accordance with certain embodiments. In FIG. 4, the topic cloud 220 (FIG. 2) is used to group entities 400 and to generate topic clusters 420. Thus, monitoring may be visualized in terms of data reach using various techniques, such as clustering analysis by topic. In particular, starting with the topic cloud 220, the entities discussing one or more common topics are grouped (e.g., if seven entities are discussing the same topic, the seven entities are put into one group 410).

Using the analyzed data (i.e., any combination of the topic cloud, the access response time, the topic response content, and the visualizations), the data reach engine 120 derives the data reach model. In certain embodiments, the data reach engine 120 constructs a neural network. This neural network may be used to model a) what/which data reach is desirable and b) the duration of the data reach adjustment. With embodiments, the data source is clipped (i.e., cropped to the relevant data by removing non-relevant information), sampled, optimized using the neural network, and used to train the data reach model.

Figure 5:
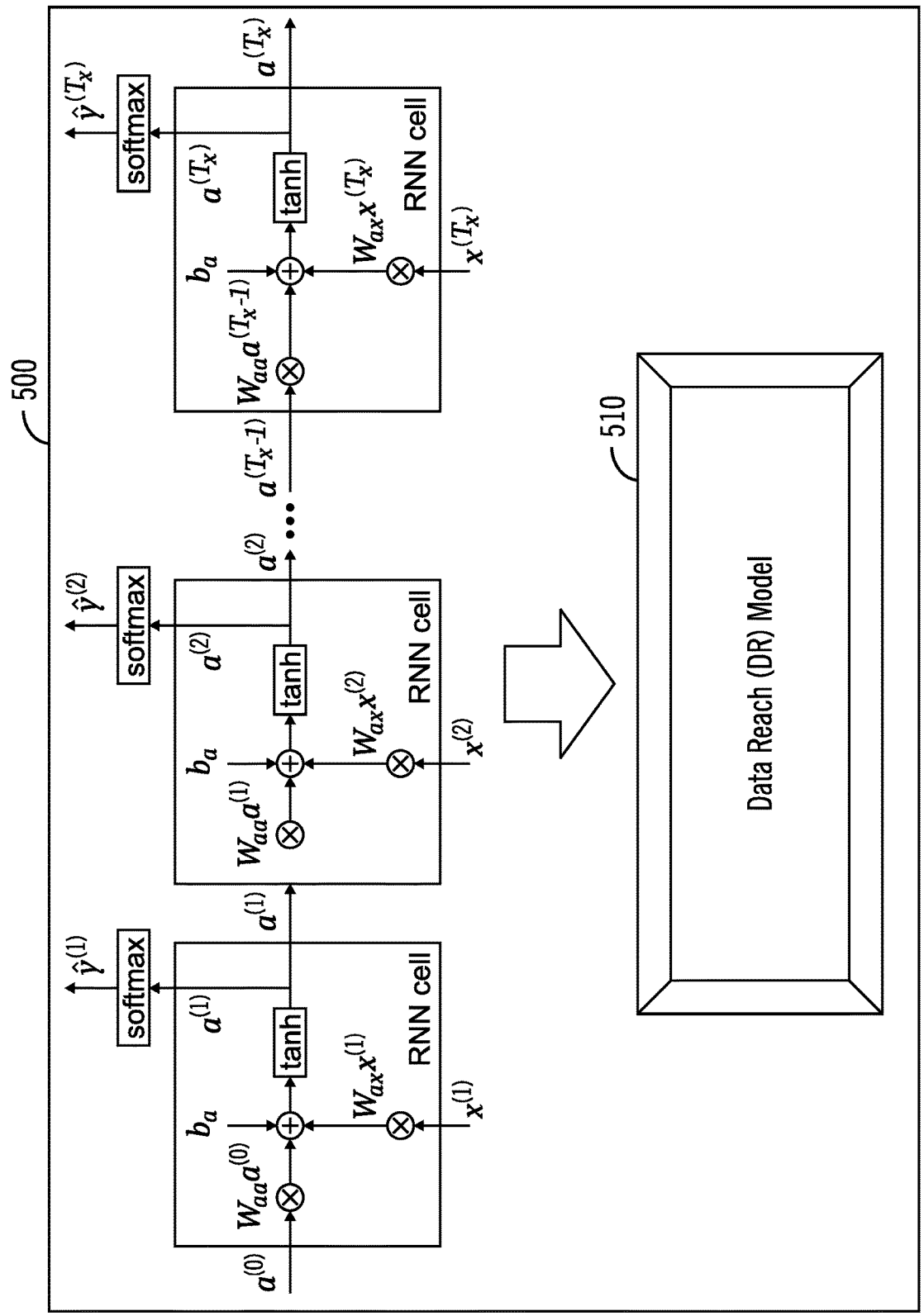
FIG. 5 illustrates an Artificial Neural Network (ANN) architecture in accordance with certain embodiments.

FIG. 5 illustrates an Artificial Neural Network (ANN) architecture 500 in accordance with certain embodiments. In the ANN architecture 500, artificial neurons and connections typically have a weight that adjusts as learning proceeds. The weight increases or decreases the strength of the signal at a connection. Typically, artificial neurons are organized in layers. Different layers may perform different kinds of transformations on their inputs. Signals travel from the first (input), to the last (output) layer, possibly after traversing the layers multiple times. The ANN architecture 500 outputs the data reach model 510.

FIGS. 6A and 6B illustrate example pseudocode 600, 610 for generating the data reach model in accordance with certain embodiments. The data reach model takes the analyzed data (the topic cloud, the access response time, the topic response content, and the visualizations) and then uses a logistic regression model to determine whether the data sources need to be changed for improved data reach.

Figure 7A:
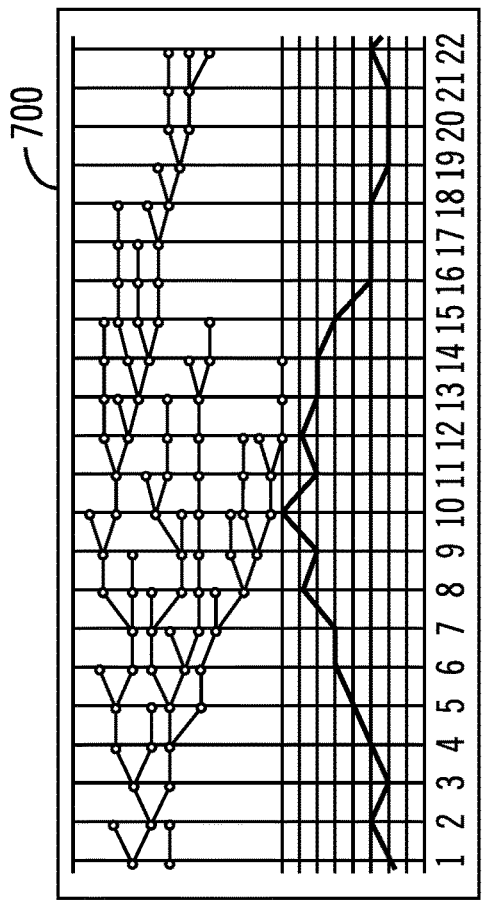
FIG. 7A and FIG. 7B illustrate example data reach model paths in accordance with certain embodiments.
Figure 7B:
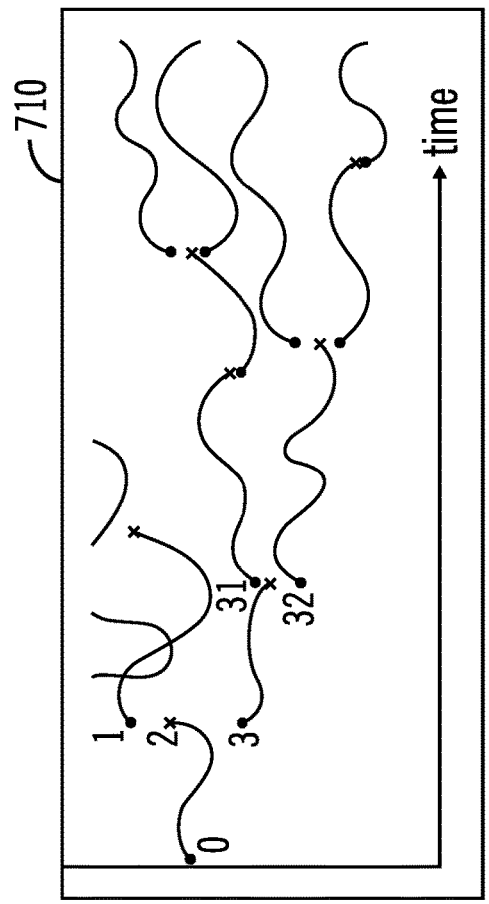

FIG. 7A and FIG. 7B illustrate example data reach model paths in accordance with certain embodiments. FIG. 7A illustrates that the data reach model may traverse linear path structures 700. FIG. 7B illustrates that the data reach model may traverse non-linear path structures 710. Thus, the data reach model is not a neural network in some embodiments.

Figure 8:
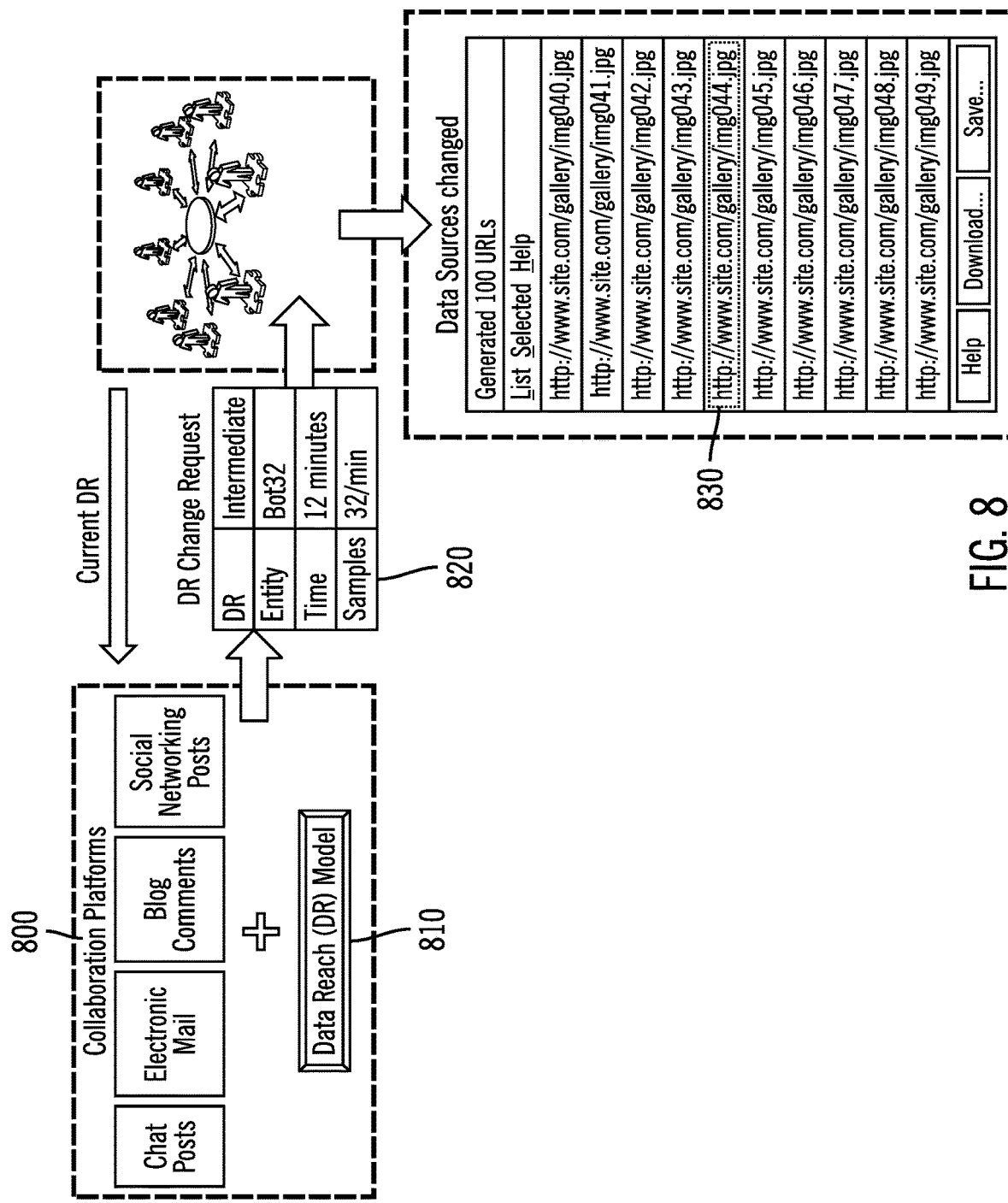
FIG. 8 illustrates extending data reach in accordance with certain embodiments.

FIG. 8 illustrates extending data reach in accordance with certain embodiments. The data reach engine 120 uses the data reach model 810 (generated from the collaboration platforms 800) to determine that the data reach should be extended. The data reach engine 120 generates a data reach change request 820, which results in a new data source 830 being added. Thus, the data reach engine 120 uses the data reach model 810 to determine the optimum data reach and duration of the data reach adjustment (e.g., 12 minutes) based on real time user activity in the collaboration platforms. In certain embodiments, the duration of the data reach adjustment lasts for a period of time or until the group of collaborators finish the collaboration.

FIGS. 9A and 9B illustrate example pseudocode 900, 910 for adding a data source in accordance with certain embodiments. The pseudocode 900, 910 determines whether the current data reach level is less than an optimum data reach level (determined using the data reach model), and, if so, the data reach engine 120 extends the data reach. Also, in certain embodiments, if the duration has passed, then the data reach engine 120 restores the data reach to the current data reach level.

In certain embodiments, the data reach model may be embodied through the architecture of space/channel applications that monitor current data reach levels and real-time chat discourse to infer the desired data reach levels. With the data reach model embodied in the architecture of space/channel data reach levels, the real-time chat discourse is monitored and used for the data reach prediction as a parameter. This may help to pre-control the data reach level before the incidents really happen.

Figure 10:
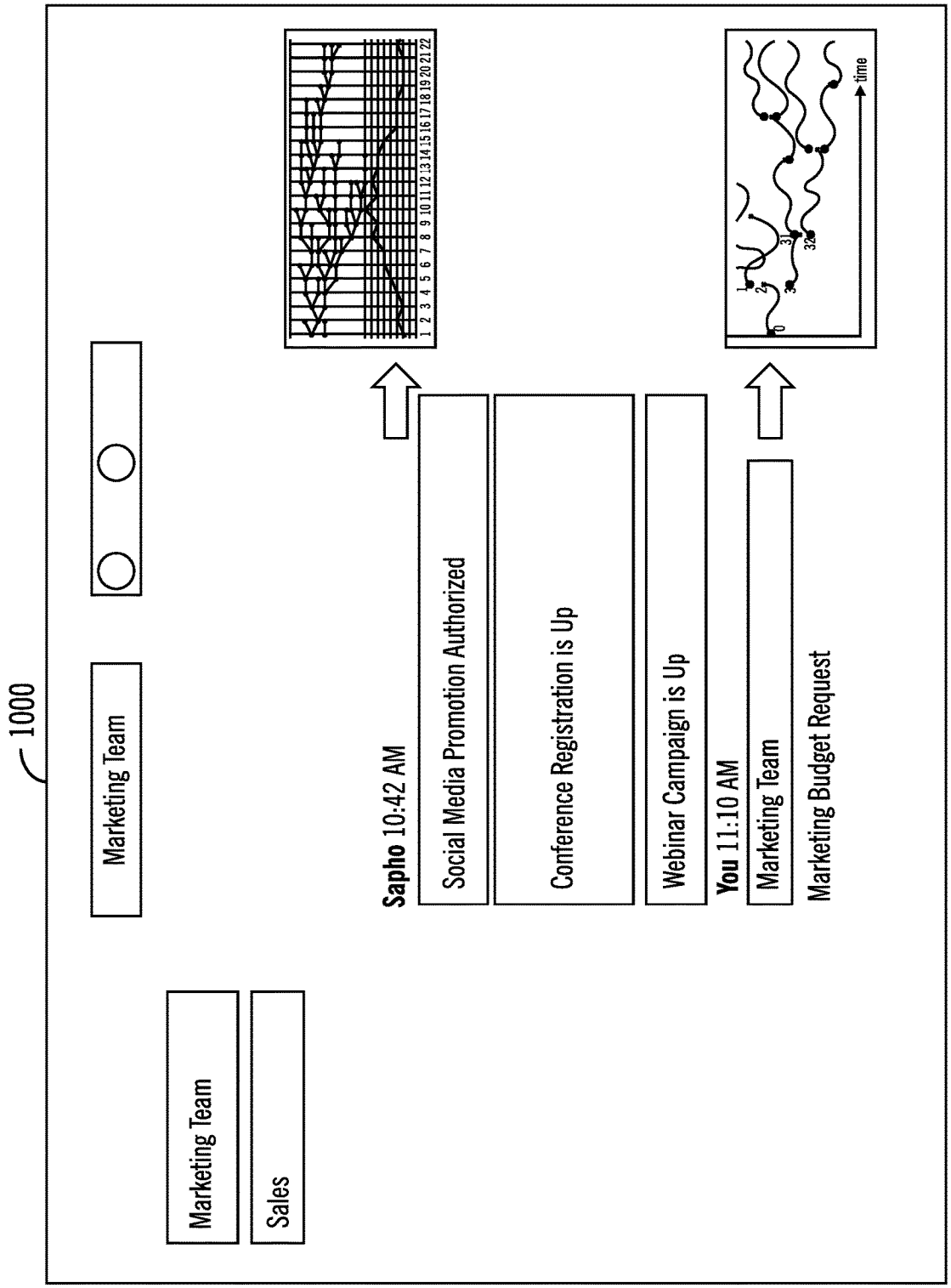
FIG. 10 illustrates an example of embedding the data reach model in a collaboration platform in accordance with certain embodiments.

FIG. 10 illustrates an example of embedding the data reach model in a collaboration platform 1000 in accordance with certain embodiments. In FIG. 10, the linear and non-linear data reach paths are shown on the collaboration platform 1000.

FIG. 11 illustrates example pseudocode 1100 for embedding the data reach model in a collaboration platform in accordance with certain embodiments. The pseudocode 1100 shows how, once the data reach model is created, the data reach model may be rendered in a pane or on the glass of a collaboration platform for a given user or users in a space.

Figure 12:
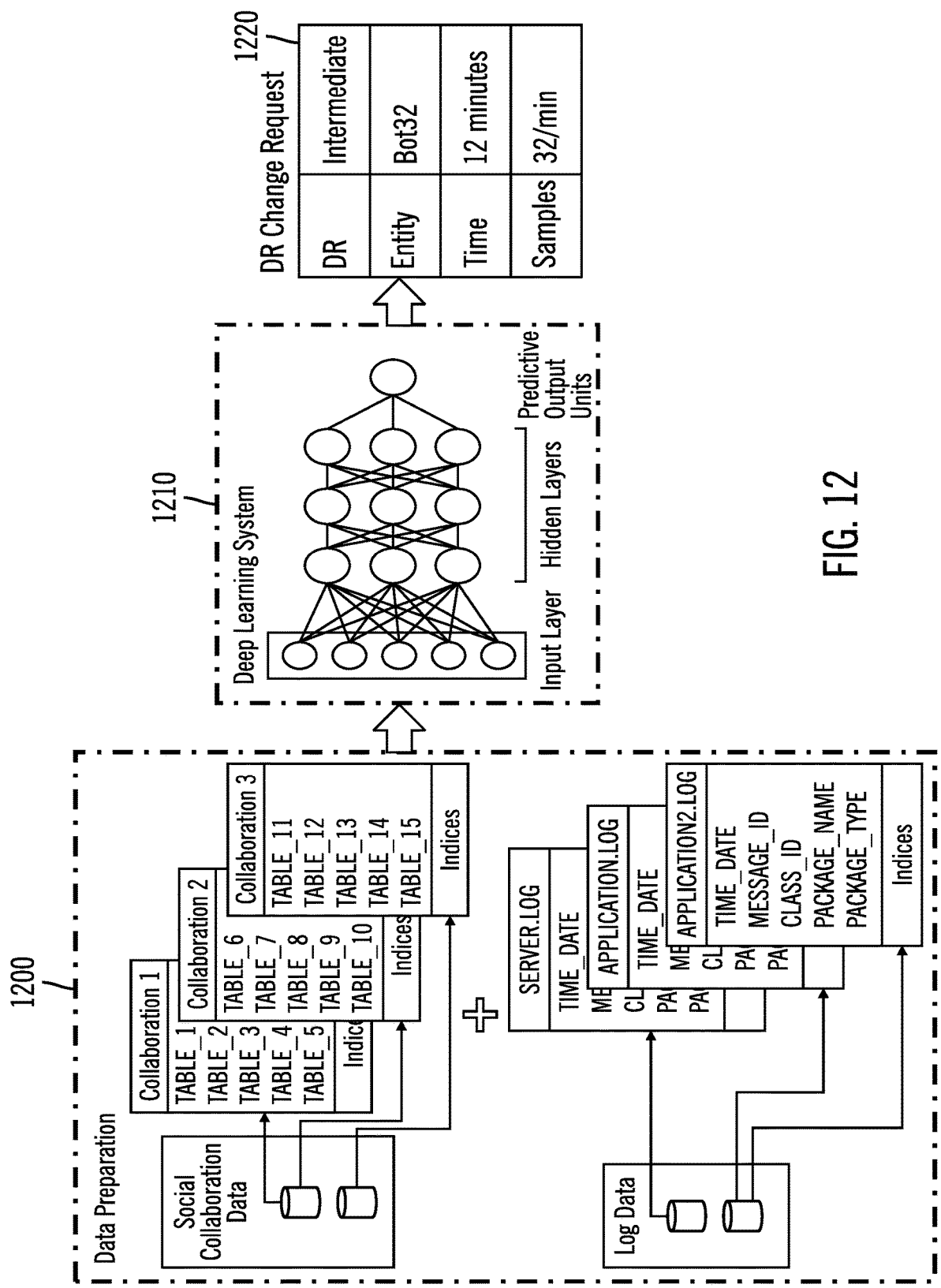
FIG. 12 illustrates predicting data reach levels using deep learning systems in accordance with certain embodiments.

FIG. 12 illustrates predicting data reach levels using deep learning systems in accordance with certain embodiments. The data reach model may be combined with deep learning systems to provide a predictive system of pre-emptive data reach level adjustments. The data reach engine 120 uses data 1200 and the deep learning system 1210 to generate the data reach change request 1220. Deep learning may be described as a subset of machine learning in Artificial Intelligence (AI) that has networks capable of learning unsupervised from data that is unstructured or unlabeled.

Figure 13A:
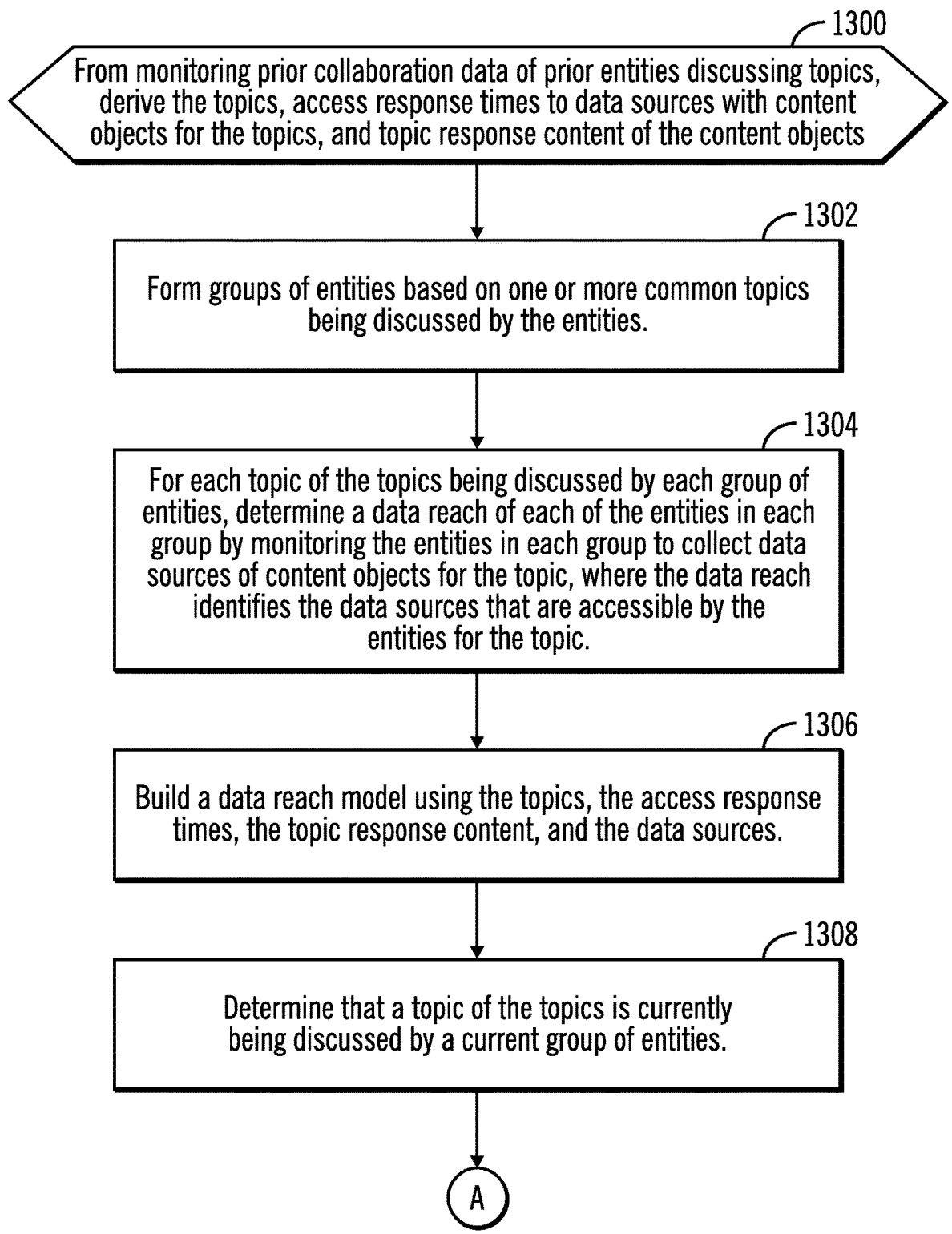
FIGS. 13A and 13B illustrate, in a flowchart, operations for extending data reach in accordance with certain embodiments.
Figure 13B:
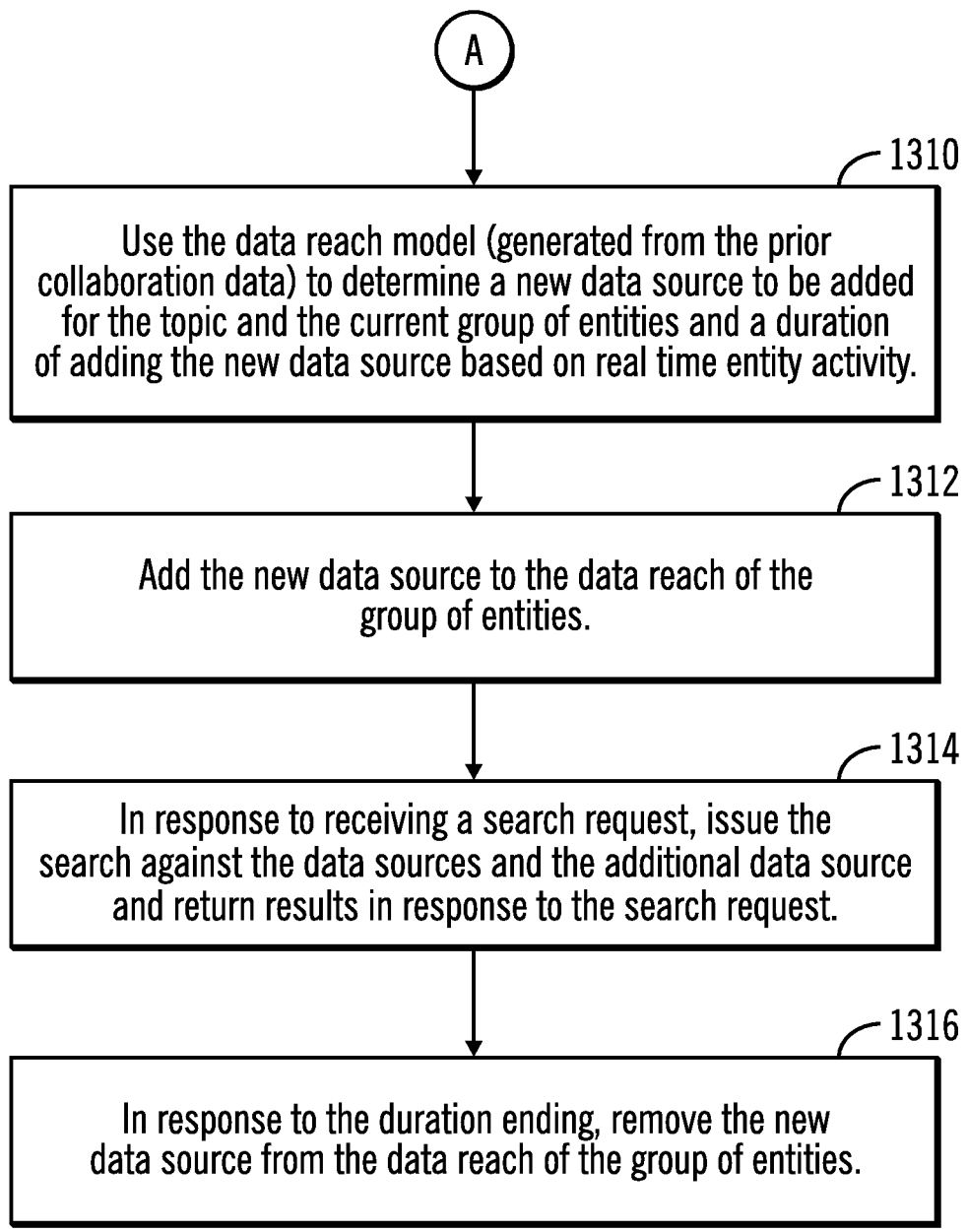

FIGS. 13A and 13B illustrate, in a flowchart, operations for extending data reach in accordance with certain embodiments. Control begins at block 1300 with the data monitoring and logging engine 110 deriving, from monitoring prior collaboration data of prior entities discussing topics, the topics, access response times to data sources with content objects for the topics, and topic response content of the content objects. In block 1302, the data reach engine 120 forms groups of entities based on one or more common topics being discussed by those entities. Each group of entities may be described as a collaboration. The monitoring of prior collaboration data is the monitoring of data of entities that discussed topics in the past (i.e., this may be described as historical data).

In block 1304, the data reach engine 120, for each topic of the topics being discussed by each group of entities, determines a data reach of each of the entities in each group by monitoring the entities in each group to collect data sources of content objects for the topic, where the data reach identifies the data sources that are accessible by the entities for the topic. In block 1306, the data reach engine 120 builds a data reach model using the topics, the access response times, the topic response content, and the data sources. In block 1308, the data reach engine 120 determines that a topic of the topics is currently being discussed by a current group of entities (i.e., a "current" collaboration). From block 1308 (FIG. 13A), processing continues to block 1310 (FIG. 13B).

In block 1310, the data reach engine 120 uses the data reach model (generated from the prior collaboration data) to determine a new data source to be added for the topic and the current group of entities and a duration of adding the new data source based on real time entity activity. In certain embodiments, the data reach engine 120 identifies more than one data source to be added and may select one or more data sources to be added based on various factors (e.g., access response times to data sources with content objects for the topics, and topic response content of the content objects).

In block 1312, the data reach engine 120 adds the new data source to the data reach of the group of entities. In block 1314, the data reach engine 120, in response to receiving a search request from an entity in the group of entities, issues the search against the data sources and the additional data source and returns results in response to the search request. In block 1316, the data reach engine 120, in response to the duration ending, removes the new data source from the data reach of the group of entities.

In certain embodiments, the data reach engine 120 is embodied in a database. In such embodiments, the data reach model may be bound to a database. For example, topic relationships may be mapped to associated database tables. Additionally, statistically significance calculations may be added to the database for a given population and stored for future recall as needed.

In certain embodiments, the data reach engine 120 is embodied in a physical server computer. In such embodiments, the computing device 100 is a server computer, and the data reach engine 120 is embodied within the server computer. The real time data reach information and the communication in the collaboration platforms may be stored and processed within a session state. A session state is typically referred to with respect to internet browsers history and sessions. Additionally, the persistent session state may be stored for historical analysis and trending predictions.

In certain embodiments, the data reach engine 120 is embodied in a client device. For example, the data reach engine 120 may be embodied in either of two types of client devices. For example, a client device may run the data reach engine 120 that receive communication events and extend the data reach. As another example, a client device may run space/channel applications.

Embodiments focus on topic awareness of collaboration interactions of entities to infer the likelihood of whether a collaboration interaction is appropriate. And, if so, enable the interaction or at least notify the parties of the sub-optimal topic awareness (for this particular time, device, context, etc.).

Figure 14:
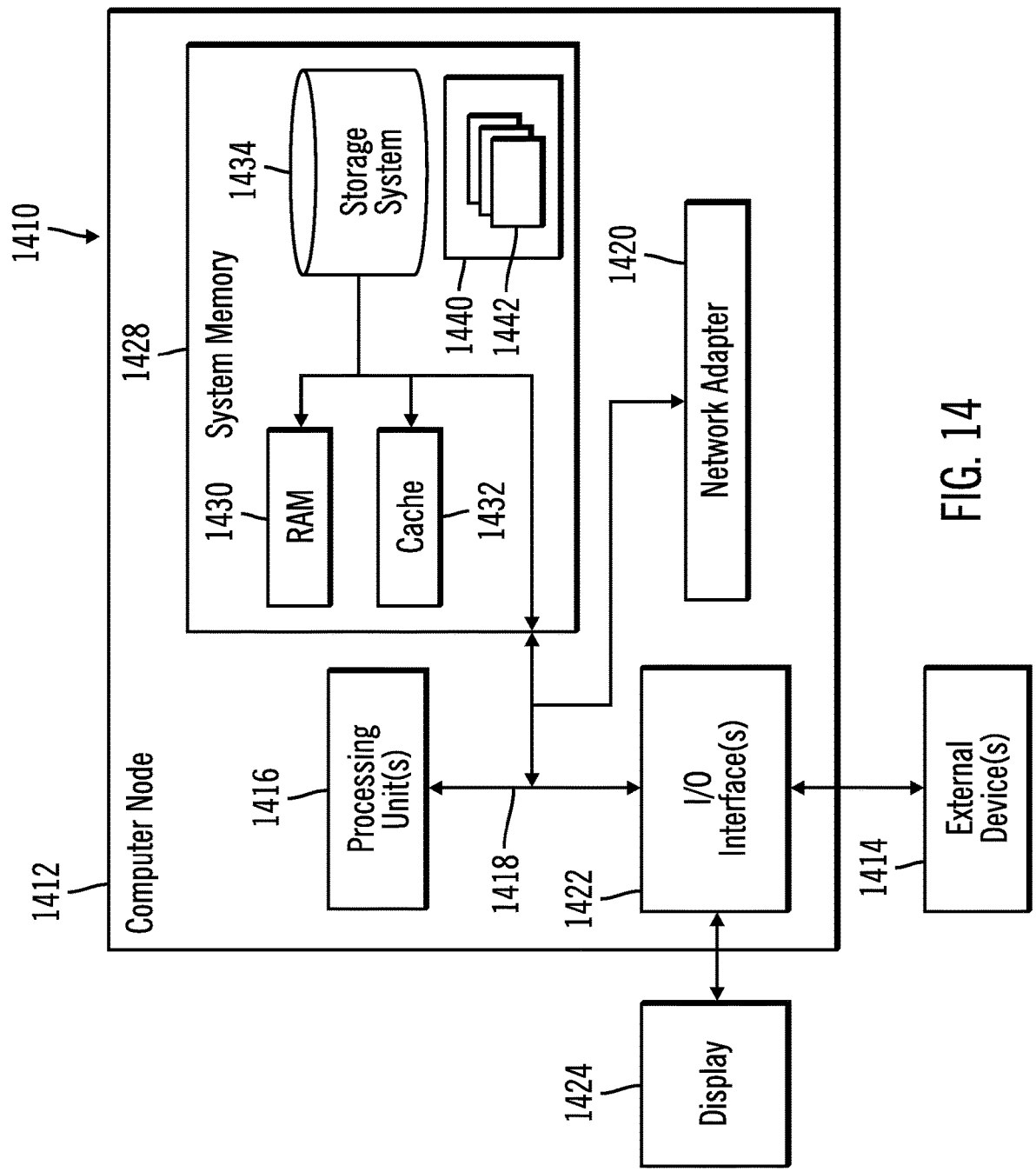
FIG. 14 illustrates a computing node in accordance with certain embodiments.

FIG. 14 illustrates a computing environment 1410 in accordance with certain embodiments. In certain embodiments, the computing environment is a cloud computing environment. Referring to FIG. 14, computer node 1412 is only one example of a suitable computing node and is not intended to suggest any limitation as to the scope of use or functionality of embodiments of the invention described herein. Regardless, computer node 1412 is capable of being implemented and/or performing any of the functionality set forth hereinabove.

The computer node 1412 may be a computer system, which is operational with numerous other general purpose or special purpose computing system environments or configurations. Examples of well-known computing systems, environments, and/or configurations that may be suitable for use with computer node 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1412 may be described in the general context of computer system executable instructions, such as program modules, being executed by a computer system. Generally, program modules may include routines, programs, objects, components, logic, data structures, and so on that perform particular tasks or implement particular abstract data types. Computer node 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer node 1412 is shown in the form of a general-purpose computing device. The components of computer node 1412 may include, but are not limited to, one or more processors or processing units 1416, a system memory 1428, and a bus 1418 that couples various system components including system memory 1428 to one or more processors or processing units 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1412 typically includes a variety of computer system readable media. Such media may be any available media that is accessible by computer node 1412, and it includes both volatile and non-volatile media, removable and non-removable media.

System memory 1428 can include computer system readable media in the form of volatile memory, such as random access memory (RAM) 1430 and/or cache memory 1432. Computer node 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, system memory 1428 may include at least one program product having a set (e.g., at least one) of program modules that are configured to carry out the functions of embodiments of the invention.

Program/utility 1440, having a set (at least one) of program modules 1442, may be stored in system memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer node 1412 may also communicate with one or more external devices 1414 such as a keyboard, a pointing device, a display 1424, etc.; one or more devices that enable a user to interact with computer node 1412; and/or any devices (e.g., network card, modem, etc.) that enable computer node 1412 to communicate with one or more other computing devices. Such communication can occur via Input/Output (I/O) interfaces 1422. Still yet, computer node 1412 can communicate with one or more networks such as a local area network (LAN), a general wide area network (WAN), and/or a public network (e.g., the Internet) via network adapter 1420. As depicted, network adapter 1420 communicates with the other components of computer node 1412 via bus 1418. It should be understood that although not shown, other hardware and/or software components could be used in conjunction with computer node 1412. Examples, include, but are not limited to: microcode, device drivers, redundant processing units, external disk drive arrays, RAID systems, tape drives, and data archival storage systems, etc.

In certain embodiments, the computing device 100 has the architecture of computer node 1412. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
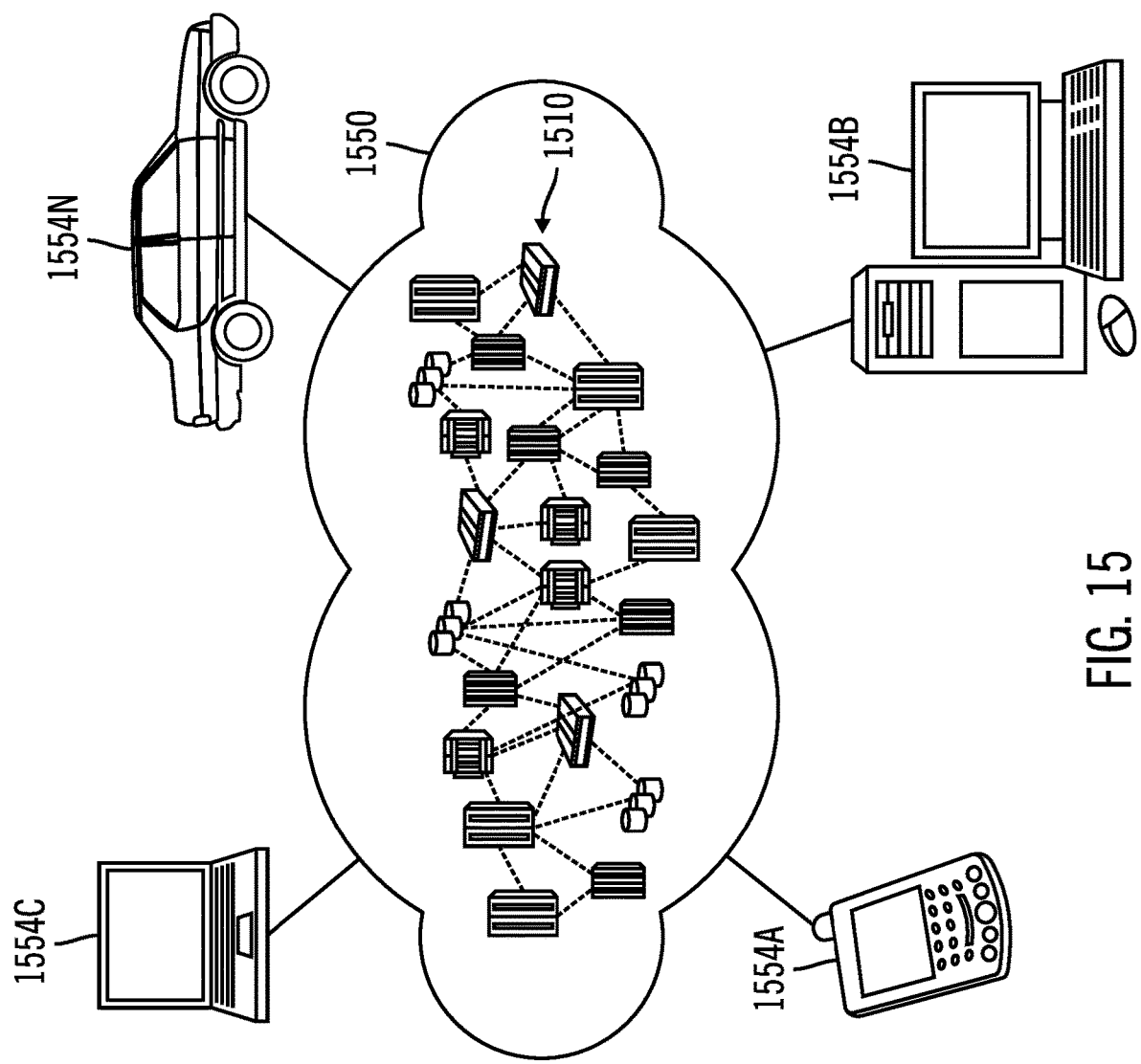
FIG. 15 illustrates a cloud computing environment in accordance with certain embodiments.

Referring now to FIG. 15, illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
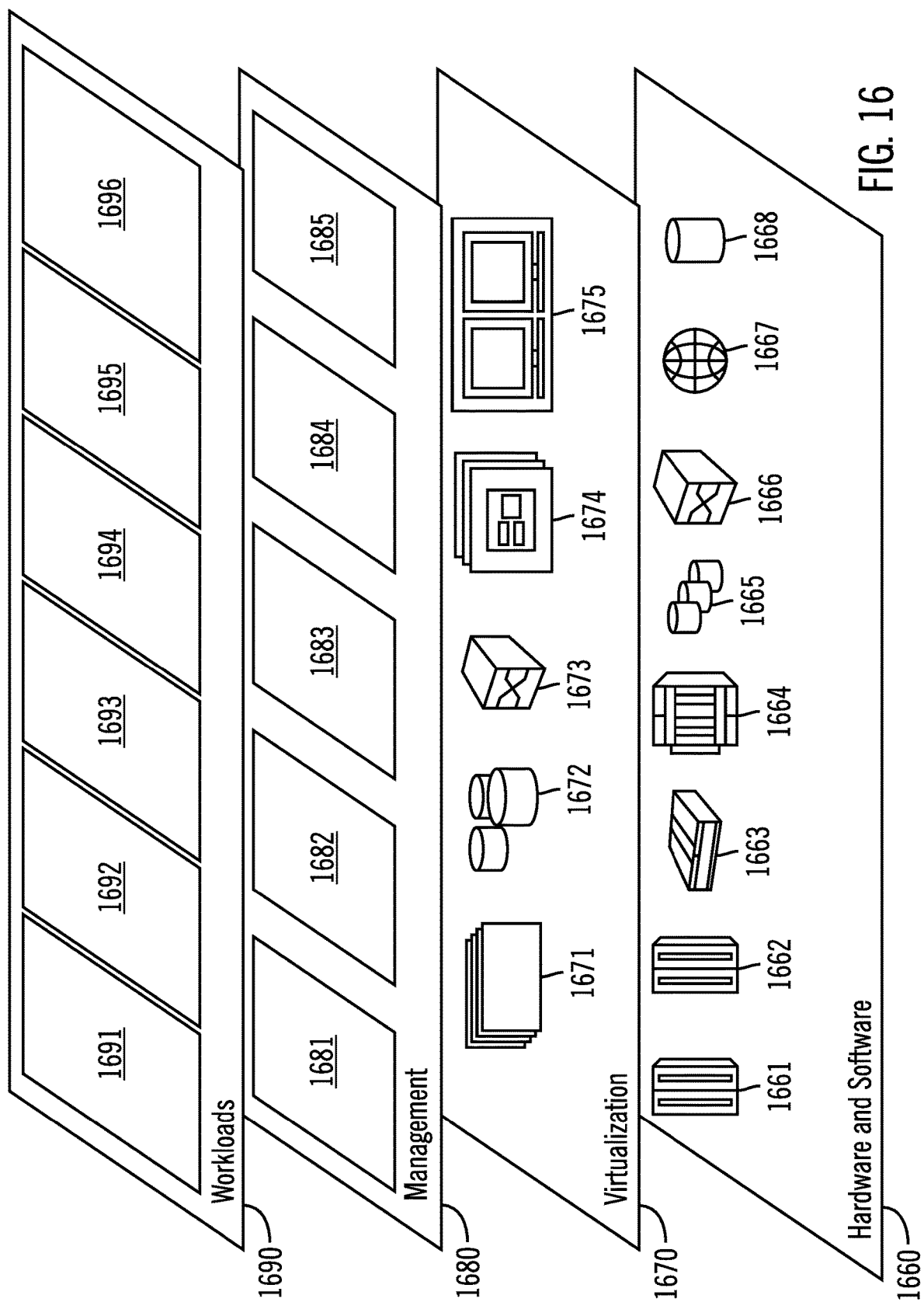
FIG. 16 illustrates abstraction model layers in accordance with certain embodiments.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667 and database software 1668.

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and Pricing 1682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized. Examples of workloads and functions which may be provided from this layer include: mapping and navigation 1691; software development and lifecycle management 1692; virtual classroom education delivery 1693; data analytics processing 1694; transaction processing 1695; and collaborative learned scoping to extend data reach for a search request 1696

Thus, in certain embodiments, software or a program, implementing collaborative learned scoping to extend data reach for a search request in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method, comprising operations for:
   from monitoring prior collaboration data of entities discussing topics, deriving the topics, access response times to data sources with content objects for the topics, and topic response content of the content objects;
   building a data reach model using the topics, the access response times, the topic response content, and data sources for the topics;
   determining that a topic of the topics is currently being discussed by a current group of entities;
   using the data reach model to determine a new data source to be added and a duration of adding the new data source based on real time entity activity;
   adding the new data source to a data reach of the current group of entities; and
   in response to receiving a search request,
      issuing the search request against the data sources and the new data source; and
      returning results in response to the search request.

2. The computer-implemented method of claim 1, further comprising:
   forming groups of entities based on one or more common topics being discussed by the entities; and
   for each topic of the topics being discussed by each group of entities, determining a data reach of each of the entities in each group by monitoring the entities in each group to collect data sources of content objects for the topic, wherein the data reach identifies the data sources that are accessible by the entities for the topic.

3. The computer-implemented method of claim 1, wherein the data reach model comprises a neural network, and wherein weights are associated with neurons in the neural network.

4. The computer-implemented method of claim 1, further comprising:
   in response to the data reach ending, removing the new data source from the data reach of the current group of entities.

5. The computer-implemented method of claim 1, wherein the new data source is identified by adding a new entity to the current group of entities.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations:
   from monitoring prior collaboration data of entities discussing topics, deriving the topics, access response times to data sources with content objects for the topics, and topic response content of the content objects;
   building a data reach model using the topics, the access response times, the topic response content, and data sources for the topics;
   determining that a topic of the topics is currently being discussed by a current group of entities;
   using the data reach model to determine a new data source to be added and a duration of adding the new data source based on real time entity activity;
   adding the new data source to a data reach of the current group of entities; and
   in response to receiving a search request,
      issuing the search request against the data sources and the new data source; and
      returning results in response to the search request.

8. The computer program product of claim 7, wherein the program code is executable by the at least one processor to perform:
   forming groups of entities based on one or more common topics being discussed by the entities; and
   for each topic of the topics being discussed by each group of entities, determining a data reach of each of the entities in each group by monitoring the entities in each group to collect data sources of content objects for the topic, wherein the data reach identifies the data sources that are accessible by the entities for the topic.

9. The computer program product of claim 7, wherein the data reach model comprises a neural network, and wherein weights are associated with neurons in the neural network.

10. The computer program product of claim 7, wherein the program code is executable by the at least one processor to perform:
    in response to the data reach ending, removing the new data source from the data reach of the current group of entities.

11. The computer program product of claim 7, wherein the new data source is identified by adding a new entity to the current group of entities.

12. The computer program product of claim 7, wherein a Software as a Service (SaaS) is configured to perform the operations of the computer program product.

13. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    from monitoring prior collaboration data of entities discussing topics, deriving the topics, access response times to data sources with content objects for the topics, and topic response content of the content objects;
    building a data reach model using the topics, the access response times, the topic response content, and data sources for the topics;
    determining that a topic of the topics is currently being discussed by a current group of entities;
    using the data reach model to determine a new data source to be added and a duration of adding the new data source based on real time entity activity;
    adding the new data source to a data reach of the current group of entities; and
    in response to receiving a search request,
       issuing the search request against the data sources and the new data source; and
       returning results in response to the search request.

14. The computer system of claim 13, wherein operations further comprise:
    forming groups of entities based on one or more common topics being discussed by the entities; and
    for each topic of the topics being discussed by each group of entities, determining a data reach of each of the entities in each group by monitoring the entities in each group to collect data sources of content objects for the topic, wherein the data reach identifies the data sources that are accessible by the entities for the topic.

15. The computer system of claim 13, wherein the data reach model comprises a neural network, and wherein weights are associated with neurons in the neural network.

16. The computer system of claim 13, wherein the operations further comprise:
in response to the data reach ending, removing the new data source from the data reach of the current group of entities.

17. The computer system of claim 13, wherein the new data source is identified by adding a new entity to the current group of entities.

18. The computer system of claim 13, wherein a Software as a Service (SaaS) is configured to perform the operations of the computer system.

\* \* \* \* \*